(12) United States Patent
Murata (10) Patent No.: US 7,944,552 B2
(45) Date of Patent: May 17, 2011

(54) METHOD FOR DISPLAYING RESULT OF MEASUREMENT OF ECCENTRICITY

(75) Inventor: Yasunori Murata, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 465 days.

(21) Appl. No.: 12/185,599

(22) Filed: Aug. 4, 2008

(65) Prior Publication Data

US 2008/0310275 A1 Dec. 18, 2008

Related U.S. Application Data

(63) Continuation of application No. 11/139,354, filed on May 26, 2005, now Pat. No. 7,511,803.

(30) Foreign Application Priority Data

May 28, 2004 (JP) .................................. 2004-159449

(51) Int. Cl.
*G01B 9/00* (2006.01)
(52) U.S. Cl. ....................................................... 356/124
(58) Field of Classification Search .................. None
See application file for complete search history.

(56) References Cited

U.S. PATENT DOCUMENTS

| | | | | | |
|---|---|---|---|---|---|
| 4,779,979 | A | * | 10/1988 | Iwane | 356/125 |
| 5,424,552 | A | * | 6/1995 | Tsuji et al. | 356/401 |
| 5,844,670 | A | * | 12/1998 | Morita et al. | 356/124 |
| 6,788,389 | B2 | * | 9/2004 | Fujishima et al. | 359/355 |
| 7,307,708 | B2 | * | 12/2007 | Murata | 356/127 |
| 2004/0042094 | A1 | * | 3/2004 | Matsuyama | 359/822 |

FOREIGN PATENT DOCUMENTS

| | | |
|---|---|---|
| JP | 64-040824 A | 2/1989 |
| JP | 04-340406 A | 11/1992 |
| JP | 2001-195578 A | 7/2001 |

* cited by examiner

*Primary Examiner* — Gregory J Toatley
*Assistant Examiner* — Juan D Valentin
(74) *Attorney, Agent, or Firm* — Canon USA, Inc. IP Division

(57) ABSTRACT

A method for displaying a result of measurement of eccentricity in an optical system is provided where an amount of eccentricity for each lens element's surface in a lens system can be displayed and where the amount of eccentricity displayed can be a magnified amount of eccentricity. Additionally a sectional view of the lens system can be displayed using scaling factor.

9 Claims, 7 Drawing Sheets

SCOPE OF OBSERVING SYSTEM

SCALE FOR SCALING FACTOR
FOR DISPLAYING LENS SHAPE

FIG. 8

SCALE FOR SCALING FACTOR
FOR DISPLAYING LENS SHAPE

METHOD FOR DISPLAYING RESULT OF MEASUREMENT OF ECCENTRICITY

CROSS REFERENCE TO RELATED APPLICATIONS

The present application is a continuation of U.S. patent application Ser. No. 11/139,354, filed on May 26, 2005, entitled "METHOD FOR DISPLAYING RESULT OF MEASUREMENT OF ECCENTRICITY", the content of which is expressly incorporated by reference herein in its entirety. This application also claims priority from Japanese Patent Application No. 2004-159449 filed May 28, 2004, which is hereby incorporated by reference in its entirety.

BACKGROUND OF THE INVENTION

1. Field of the Invention

The present invention relates to a method for displaying a measurement of eccentricity in an optical system. More particularly at least one exemplary embodiment relates to displaying, analysis of and improving the eccentricity in a multi-lens system.

2. Description of the Related Art

Conventional methods for measuring eccentricity can be summarized with respect to (e.g. Yoshiya MATSUI and Masayuki USUI, Kougakukei no Henshin Sokutei ni Tsuite [Measurement of Eccentricity in an Optical System], Optical and Electro-Optical Engineering Contact, vol. 13, No. 11, pp. 11-20) three approaches associated with particular lenses and measurement techniques as:

(1) A method associated with measuring eccentricity while rotating a lens;
(2) A method associated with multiply reflected light rays used in the measurement of a Stationary lens; and
(3) A method associated with an Image rotator measurement of a Stationary lens.

All of these approaches project an indicator to a position of an apparent center of curvature of a surface to be measured by autocollimation and calculate the amount of eccentricity on the basis of a state (amounts of shift and displacement) of a reflected image from the surface with respect to a measuring reference axis.

Approach (1) measures eccentricity while rotating the lens to be measured. Approach (1) has an advantage that it can realize high-precision measurement in a simple structure, but has a disadvantage that it cannot accurately measure eccentricity for a lens system to be measured containing a movable unit, like a zoom lens. A lens system containing a movable unit requires a minute clearance around a sliding portion for moving the movable unit. Therefore, a process of measuring eccentricity while rotating a lens system to be measured, varies the weighted position of the lens, thus changing a state of eccentricity.

Approach (2) utilizes light rays that have made multiple passes between half mirrors and the lens to be measured. Approach (2), does not rotate the lens to be measured, so it can measure eccentricity of a lens system containing a movable unit. However, since the measuring light rays pass through half mirrors as much as six times, a loss of light intensity is a serious problem (e.g. Japanese Patent Publication No. 3-054287).

Approach (3) can measure eccentricity without rotating a lens system to be measured by utilizing an image rotator. In addition, since the number of times light passing through a half mirror is small, a loss of light is small. Propositions with this approach are disclosed in, for example, Japanese Patent Publication Nos. 51-009620, 7-081931, and 7-039982, and Japanese Patent No. 2621119.

A further lens eccentricity measurement system measures (e.g. Japanese Patent Laid-Open No. 4-190130) eccentricity by relatively moving an autocollimation optical system and the lens to be measured.

In the conventional systems described there is no specific proposition disclosed as to a method for analyzing a result of measurement of eccentricity and a method for displaying it.

Measurement of eccentricity of an optical system is aimed originally at analyzing what element is eccentric in a lens system to be measured and how eccentricity is present in the element and at obtaining effective information to deal with an eccentricity problem. In measurement of eccentricity of the system, even if the eccentricity of each surface of the lens system to be measured is accurately measured, displaying a result of measurement of eccentricity of each surface as only a numerical value is insufficient for readily determining a state of eccentricity and obtaining effective information to address an eccentricity problem.

This is because there are various definitions of coordinate systems (e.g., a rectangular coordinate system, a polar coordinate system, the orientation of coordinate axes, and the position of the origin) for a parallel eccentric component and a slope eccentric component in the amount of eccentricity, both the components being required for displaying numerical values indicating a state of eccentricity, and numerical values for one state of eccentricity may vary depending on a selected definition. Additionally, even if a selected definition is explicitly pointed out, it is difficult for one of ordinary skill to accurately and readily determine a state of eccentricity of the system.

In order to analyze an eccentricity state of, in particular, a lens system including multiple lens groups, such as a zoom lens, it is necessary to classify eccentricity into three eccentricity components consisting of a first one for the entire lens system, a second one for each lens group, and a third one for each lens element in each lens group and to determine how each eccentricity component is present with respect to the lens system in a design reference state. It is significantly difficult for one to determine and for displaying the details of the eccentricity of the lens system (e.g., the location of a tilted part, the position of a point of tilting, the degree and direction of tilting) by using only displayed numerical values from a result of measurement of eccentricity.

SUMMARY OF THE INVENTION

The present invention provides a method for displaying a result of eccentricity measurement of an optical system. In at least one exemplary embodiment the method can be used by an observer to readily determine the measurement.

According to one aspect of the present invention, a method is provided for displaying a result of eccentricity measurement of a lens system including: sequentially projecting an indicator to a position of each design apparent center of curvature of a plurality of surfaces to be measured, the surfaces being included in the lens system to be measured; and displaying an amount of eccentricity of each surface to be measured, the amount of eccentricity being determined from a state of a reflected image of the indicator, the reflected image being reflected from each surface to be measured. The amount of eccentricity can be displayed so that the amount of eccentricity is magnified using a magnification factor, the magnification factor representing a magnification amount to multiply the amount of eccentricity by, and the magnified amount of eccentricity is represented in a sectional view of the lens, the magnification factor being different from a scaling factor for displaying the lens.

Further features and advantages of the present invention will become apparent from the following description of exemplary embodiments with reference to the attached drawings.

BRIEF DESCRIPTION OF THE DRAWINGS

Exemplary embodiments will become more fully understood from the detailed description and the accompanying drawings.

DESCRIPTION OF THE EMBODIMENTS

The following description of exemplary embodiment(s) is merely illustrative in nature and is in no way intended to limit the invention, its application, or uses.

Processes, techniques, and materials as known by one of ordinary skill in the art may not be discussed in detail but are intended to be part of the enabling description where appropriate.

Embodiments of the present invention are described with reference to the drawings.

Figure 1:
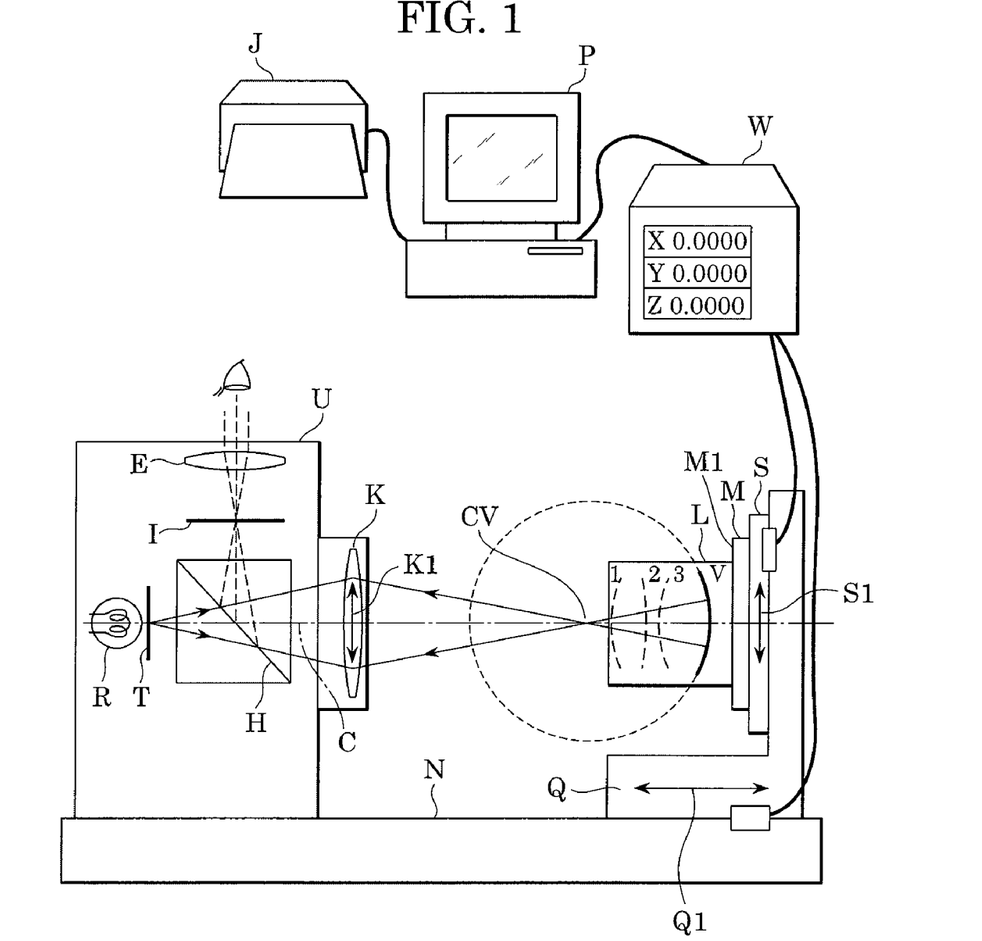
FIG. 1 illustrates a schematic view of an apparatus for measuring eccentricity in accordance with at least one exemplary embodiment.

FIG. 1 illustrates a schematic illustration of an apparatus for measuring eccentricity in accordance with at least one exemplary embodiment. The apparatus uses a method for displaying a result of eccentricity measurement according to at least one exemplary embodiment. Although FIG. 1 illustrates use of a moveable stage system, exemplary embodiments are not limited to moveable stage systems. Likewise, methods for displaying a result of eccentricity measurement, in accordance with at least one exemplary embodiment, may be of any system as long as information regarding the position of an apparent center of curvature of a lens system to be measured is obtained (e.g. by autocollimation as shown in FIG. 1, or other techniques known by one of ordinary skill).

In FIG. 1, an indicator chart T is illuminated with beams from a light source R, which is projected toward a lens system L to be measured, the light is at least partially reflected from the lens system L. The reflected light is passes through a collimator objective K, where the transmitted light is redirected via a half mirror (beam splitter) H toward a surface chart I, forming a first image on surface chart I. Note that the collimator objective K can be replaceable and its focal length can be changed in accordance with an apparent radius of curvature of a surface to be measured.

In addition to a reflected image of indicator chart T from the lens system, the first image, the image of indicator chart T is also projected on surface chart I directly from the half mirror H, a second image. In at least one further exemplary embodiment an image on indicator chart T can be projected instead of the chart itself being projected. Since a projected image of the indicator chart T may be changed by replacing the collimator objective K with a new one, the position of the collimator objective K is adjustable in a direction K1 perpendicular to a measuring reference axis C such that the image of the indicator chart T is present in the measuring reference axis (measuring axis) C.

Figure 2:
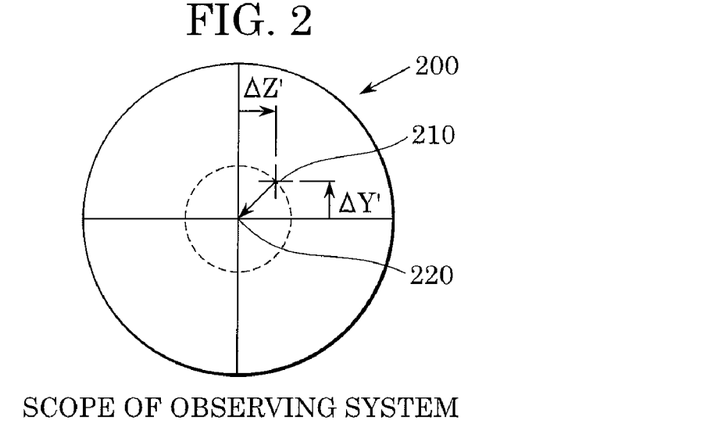
FIG. 2 illustrates a visual scope of an observing system.

In the exemplary embodiment shown in FIG. 1, the lens system L can include a plurality of lens surfaces 1 to V and can be fixed to a mount M for mounting a lens. A person who measures eccentricity observes the amount of shift (the amount of displacement) between the first and second images on surface chart I. The amount of shift can be viewed through an eyepiece E. In the embodiment shown the indicator chart T and the image-forming surface chart I are equidistant from the center of the half mirror H. The second image is formed on the image-forming surface chart I such that the image is inverted and life size. FIG. 2 shows a visual scope 200 of an observing system with the center of a reflected image of the indicator chart T, the first image 210, represented simply as "+." In this particular exemplary embodiment an amount of displacement, $\Delta Y'$ and $\Delta Z'$, is present with respect to the second image at the center of the image-forming surface chart I 220.

The light source R, the indicator chart T, the half mirror H, the collimator objective K, the image-forming surface chart I, and the eyepiece E constitute an autocollimation optical system U. For measuring eccentricity, a relative distance between the autocollimation optical system U and the lens system L is varied along the measuring reference axis C, and an image of the indicator chart T is projected to the position of an apparent center of curvature CV of each surface of the lens system L. The apparent center of curvature CV being calculated by a calculating device P for calculating eccentricity, and the amount of eccentricity is measured from the first to V-th surfaces in succession.

The term "the position of an apparent center of curvature" used herein is the position of a center of curvature, measured with respect to the first surface of the lens system L, which is calculated from design data (e.g., a radius of curvature of each surface, a space, a refractive index, and an effective aperture) for the lens system L by means of the calculating device P with paraxial calculation. The term "an apparent radius of curvature" is defined by a distance between the position of an apparent vertex of a surface to be measured (the position of a surface) and the position of the apparent center of curvature.

The mount M can be tilted such that its mounting face M1 is adjusted so as to be perpendicular to the measuring reference axis C. The mount M can be fixed to a movable stage S, which is movable in a direction S1 perpendicular to the measuring reference axis C (e.g. up and down the paper and/or in and out of the paper). The movable stage S is operatively connected to a movable stage Q which is movable Q1 along the measuring reference axis C. Therefore, the mount M can be moved along two axes, i.e., the vertical direction in FIG. 1 (up and down the page) and the direction perpendicular (horizontally) in FIG. 1 (left to right on the page). The movable stage Q can move horizontally in FIG. 1 on a rail N. The horizontal axis in FIG. 1 is referred to as the x-axis, where the vertex of the first surface of the lens system L is designated as the origin of the coordinate system. Distances along the x-axis to the left of the origin are taken as negative, and distances to the right are taken as positive. The vertical axis in FIG. 1 is designated as the y-axis with the same origin as the x-axis. The z-axis completes a right hand rule and is perpendicular to the x and y axis.

The rail N extending along the measuring reference axis C can be made of precision material (e.g. stainless steel, aluminum, plastic, or other precision material for use in precision optical systems as known by one of ordinary skill). For example in the exemplary embodiment shown a precision metal can be used, such that rail N is a flat sturdy plate. In such an exemplary embodiment, the movable stages S and Q disposed thereon can have low error levels (e.g. 10-second to 20-second error in slope with respect to one meter of travel of each stage). For higher precision, each stage may be formed so as to have a shaft formed from a precision material (e.g. a machined pillar made of ceramic or natural plutonic rock). Additionally an air bearing system can be used resulting in a system with reduced error (e.g. 5-second or less error in slope with respect to one meter of travel of each stage).

A procedure of measuring eccentricity in accordance with at least one exemplary embodiment is described next and includes the following steps:

(1) The replaceable collimator objective K is installed in the autocollimation optical system U. The collimator objective K is fixed such that a projected image of the indicator chart T is present in the measuring reference axis C;

(2) The mount M is tilted so as to be substantially perpendicular to the measuring reference axis C;

(3) The movable stage S is adjusted such that the vertical center of the mount M approximately intersects the measuring reference axis C. In this position, values for y and z appearing on a detecting device W are directly related to the y and z coordinates of a reference origin;

(4) The lens system L is placed on the mount M. The movable stage Q is moved such that an image of the indicator chart T is formed in the vertex of the first surface of the lens system L. In this position, a value for the x-axis appearing on the detecting device W is set as the x-coordinate of the reference origin;

(5) On the basis of design data for the lens system L in a design reference state (a state with no eccentricity), the calculating device P calculates the positions of a design apparent center of curvature, an apparent vertex, and a radius of curvature for each of the first to end surfaces, where the vertex of the first surface of the lens system L is the reference origin;

(6) The movable stage Q is moved such that a projected image of the indicator chart T is projected to the position of the calculated design apparent center of curvature for each surface to be measured while the amount of travel in the x-axis appearing on the detecting device W is being checked;

(7) A reflected image of the indicator chart T, the first image, is formed in an image-forming surface of an observing system (the image-forming surface chart I) and is observed through the eyepiece E; and (8) When a surface to be measured is eccentric, the first image is displaced from the origin of the image-forming surface chart I, which can correspond to location of the second image. To determine the displacement the movable stage S is moved such that the first image with the origin of the image-forming surface chart I, which in some exemplary embodiments is the location of the second image. The amounts of travel of the movable stage S to this position in the y and z directions, $\Delta Y$ and $\Delta Z$, are detected by the detecting device W, and the detected values are then sent to the calculating device P. These values correspond to the position of a measured apparent center of curvature.

If no eccentricity is present in the lens system L and the optical axis of the lens system L is coincident with the measuring reference axis C, light beams of the indicator chart T projected to the position of the design apparent center of curvature are reflected by the surface to be measured and return backward along an optical path leading to the surface. The returning beams are divided into two parts by the half mirror H; one is to be formed on the indicator chart T and the other is to be formed on the image-forming surface chart I, which is the same distance away from the center of the half mirror H as indicator chart T and belongs to the eyepiece system. When no eccentricity is present in the lens system L and the optical axis of the lens system L is coincident with the measuring reference axis C, a reflected image, the first image, is coincident with the origin lying in the center of the image-forming surface chart I of the observing system, or in some exemplary embodiments the second image.

If eccentricity is present in the lens system L, the first image is displaced from the origin of the image-forming surface chart I of the observing system, or in some embodiments the second image. In this embodiment, the detecting device W detects the amount of travel of the movable stage S, and the calculating device P calculates the position of an actual apparent center of curvature. The detecting device W detects the amount of travel by reading information regarding the amount of travel from a sensor, such as a magnetic scale, disposed in the x, y, and z axes in each stage. In this embodiment, the amount of travel, $\Delta Y$ and $\Delta Z$ (parallel eccentricity), of the movable stage S with respect to the measuring reference axis C are identical to the amount of parallel eccentricity in the position of an apparent center of curvature of a surface to be measured.

With previously proposed methods, in order to determine the amount of parallel eccentricity, $\Delta Y$ and $\Delta Z$, in the position of an apparent center of curvature of a surface to be measured, the amount of displacement, $\Delta Y'$ and $\Delta Z'$, of a reflected image, the first image, of the center of curvature in an observing system is detected, the detected value is multiplied by a projection magnification of a collimator objective, and the resultant value is divided by two because a reflected image is doubled. Therefore, when the collimator objective is replaced with a new one or its focal length is varied, it is necessary to change the projection magnification of the collimator objective to a predetermined magnification before calculation, every time the lens is replaced or the focal length is changed.

In at least one method according to at least one exemplary embodiment, the amount of travel of the stage, $\Delta Y$ and $\Delta Z$, is calculated independently of the projection magnification of the collimator objective, i.e., the amount of travel is identical to the amount of parallel eccentricity of the position of an apparent center of curvature of the surface to be measured. Thus, in at least one exemplary embodiment, a calculational algorithm used by the calculating device P can be simpler than algorithms used in conventional methods. In further exemplary embodiments the algorithm could be the same or of more complexity compared to conventionally used algorithms, to improve accuracy.

Figure 3:
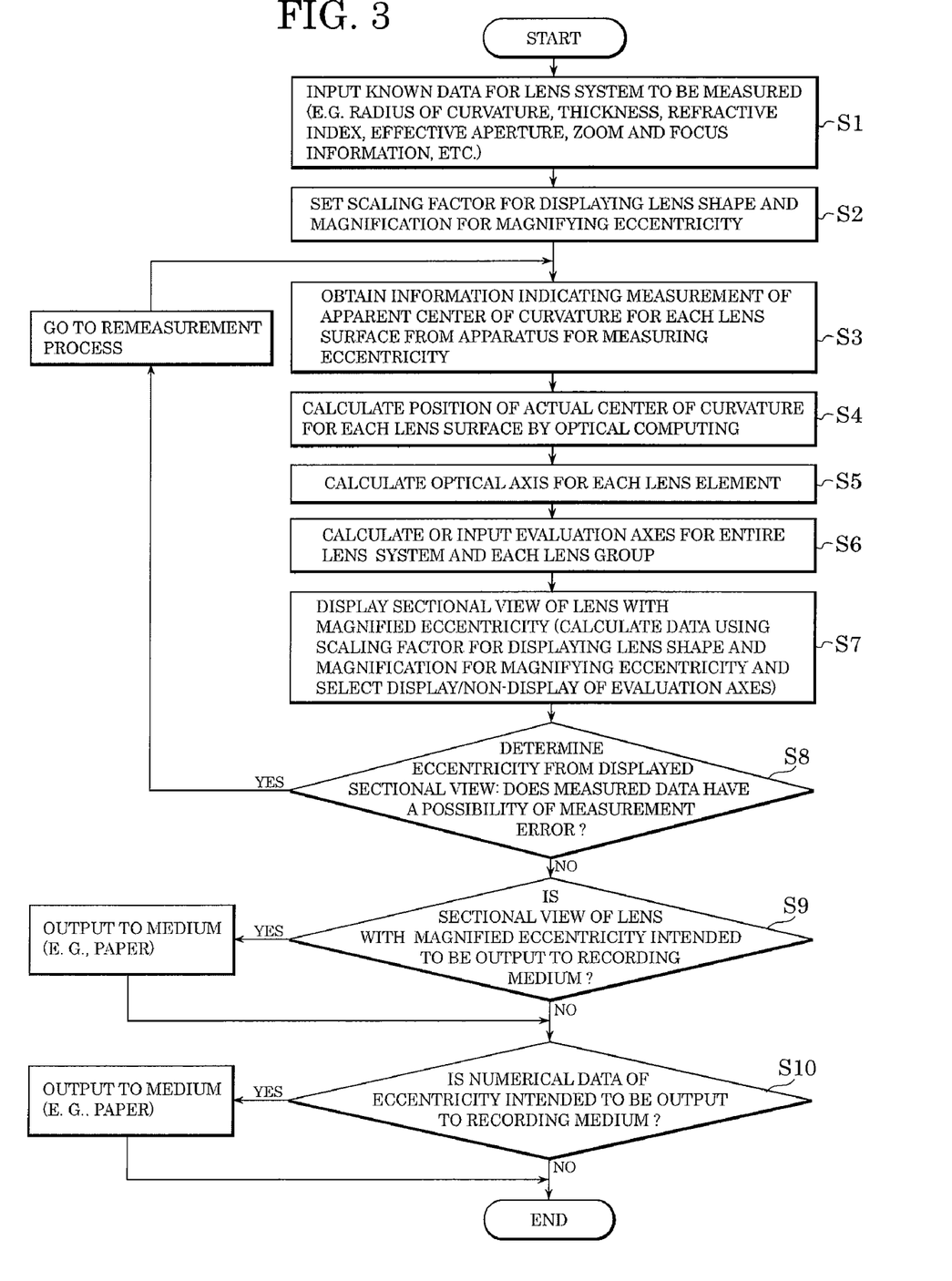
FIG. 3 illustrates a flowchart of a method for displaying a result of eccentricity measurement in accordance with at least one exemplary embodiment.

A method of analysis and display in accordance with at least one exemplary embodiment is shown in the flowchart of FIG. 3.

In step S1, known data for the lens system L (e.g., radius of curvature, a space of surfaces, a refractive index, and an effective aperture for light beams) is input to the calculating device P. If the lens system L includes multiple lens groups (e.g., a zoom lens), information for individual lens groups is input together. If such data was previously input, step S1 is omitted.

In step S2, a scaling factor for displaying a sectional view of the entire lens system L is set such that the sectional view of the lens system L is displayed on a display screen of the calculating device P. Additionally the sectional view can be output to an output medium (e.g., a sheet of paper) in an output device J at an appropriate size. The scaling factor for displaying the sectional view of the lens system L on the display screen at an appropriate size is calculated by computing the size in the optical axis from data indicating the space between surfaces of the lens system L. The size in the perpendicular (horizontal) direction is computed from data indicating the effective aperture. In alternative exemplary embodiments the scaling factor for display can be a chosen value and can be determined prior to operation of the calculating device P or during.

In step S2, a magnification factor for exaggerating the displayed eccentricity is set as well. The setting of this magnification factor can be related to eccentricity tolerance. For example, assuming a lens having an effective aperture $\phi$ of 20 mm, in order to display an eccentricity error of ±0.1 mm at ±10 mm within the maximum effective aperture in a sectional view of the lens with exaggerated displayed eccentricity, the magnification factor for magnifying eccentricity is 10 divided by 0.1, which is, 100 times. Thus in this particular example the measured eccentricity is multiplied by the magnification factor of 100 to derive the exaggerated display eccentricity.

In at least one exemplary embodiment if a result of measurement of eccentricity of one lens system L is compared with that of another lens system L having an equivalent error of eccentricity, the exaggerated displayed eccentricity should be similar and thus, in this particular exemplary embodiment, the magnifications are substantially equal.

In step S3, information regarding an apparent center of curvature of each surface of the lens system L is obtained from the apparatus for measuring eccentricity. A way of obtaining the information may be a way of successively obtaining a measurement from the apparatus or by storing information indicating a measurement value for measured eccentricity on a recording medium and retrieving the stored information. Various storage mediums can be used to store information (e.g. Disk, tape, CD, DVD, RAM, SDRAM, flash memory, and other storage mediums as known by one of ordinary skill).

In step S4, the position of an actual center of curvature is calculated (e.g. via optical computing and for a selected number of lens surfaces) from the input known data for the lens system L and the information indicating the measured apparent center of curvature for each surface. In at least one exemplary embodiment the apparent center of curvature can be measured (e.g. by autocollimation) and the actual center of curvature can be calculated from a relation between an object point and an image point (e.g. with optical paraxial calculation).

In step S5, an optical axis of each lens element is calculated. The optical axis is defined by a straight line connecting an actual center of curvature of a first surface (a surface facing an object) of each lens element and that of a second surface (a surface facing an image).

In at least one exemplary embodiment the optical axis is defined as a straight line where angles, defined between the normals of two surfaces intersected by the straight line (e.g. the first lens surface and the second opposing lens surface), become minimal.

In step S6, an evaluation axis that is the most suitable for the entire lens system and each lens group is set. In at least one exemplary embodiment the evaluation axis may be determined as a mean axis representing the entire lens system and each lens group or may be set by any input value.

There are several approaches to setting the mean axis to function as the evaluation axis and any method described below or known by one of ordinary skill is intended to fall within at least one exemplary embodiment. Following are several examples for methods of determining the evaluation axis:

determining a straight line satisfying that the difference from a center of curvature of each surface in a lens group for which the evaluation axis is to be set is the minimum by a minimization process (e.g. the least square method);

determining a straight line satisfying that the difference from the center of the optical axis of each lens element in a lens group for which the evaluation axis is to be set is the minimum by a minimization method (e.g. the least square method); and calculating a simple mean of the amount of a slope eccentric component and a simple mean of the amount of a parallel eccentric component in the optical axis of each lens element in a lens group for which the evaluation axis is to be set.

Likewise in at least one exemplary embodiment the method described above for obtaining the straight line optical axis, where the angles formed by the intersection of a straight line and two lens surfaces are minimized, can also be used to define a mean axis. For example the minimization of the angles can be performed using the least squares method, or other minimization methods known by one of ordinary skill, and the resultant optical axis used as the mean axis.

In at least one further exemplary embodiment a further definition for the mean axis can use a minimization of angles and refractive index weights. For example angles can be defined between a straight line intersecting each surface in a lens group for which the evaluation axis is to be set and the normal at each intersection point. The refractive-index weight can be defined by the difference in refractive index between the front of the relevant surface and the back thereof. Then the product of the angles and the value of the refractive index weight can be minimized (e.g. by least squares).

In step S7, an optical axis of each lens element of the lens system L can be calculated by the calculating device P and evaluation axis of the entire lens system. Then a magnification factor for magnifying (exaggerating) the amount of eccentricity of each lens group is applied, and a sectional view of the lens system with magnified (exaggerated) eccentricity is displayed on a display screen of the calculating device P. The term "exaggerating" or "magnifying" is used to refer to a modified calculated eccentricity, which has been multiplied by a magnification factor. The term "scaling factor" is used in context for modifying the sectional view for display. The two terms, magnification factor and scaling factor are independently valued, thus the magnification factor need not be of identical value to the scaling factor.

The shape of each lens in a design reference state where no eccentricity is present is determined from data indicating lens system properties (e.g. radii of curvature, effective apertures) where the space between and including two surfaces constitutes a lens element in the lens system. The determined lens shape is then multiplied by the scaling factor for displaying the lens shape, and data regarding coordinates for representing the lens shape of each lens element is calculated. The difference between the calculated optical axis of each lens element and the measuring reference axis is the amount of eccentricity. An amount of parallel eccentricity and a tangent component of a tilt amount of eccentricity in the amount of eccentricity of each lens element are each multiplied by the magnification factor for magnifying eccentricity in order to calculate parallel eccentricity and slope eccentricity for displaying magnified eccentricity. The coordinates of the lens shape in an eccentric state are calculated by coordinate transformation.

A sectional view of the lens with magnified eccentricity can be displayed on the display screen in accordance with data for each lens element in an eccentric state, the data being subjected to coordinate transformation. Displaying the sectional view of each lens element of the lens with magnified eccentricity together with the optical axis of each lens element enables an observer to readily determine whether eccentricity is present.

In addition, the evaluation axis of the entire lens system, the evaluation axis of each lens group, and the lens in a design reference state, in which no eccentricity is present, can be displayed or hidden in a sectional view of a lens with magnified eccentricity in response to an instruction based on selection. For example a user using a user interface (e.g. mouse, keyboard) can select to display the design reference state.

In step S8, it is determined whether eccentricity exceeding set eccentricity tolerance is present in the lens system L from a displayed sectional view of the lens with magnified eccentricity. If such eccentricity is present, the eccentricity is measured again in order to determine whether a large eccentricity error is actually present in the lens system L or the eccentricity results from a measurement error. If the same result is obtained from a remeasurement process, it is determined that a large eccentricity error is actually present in the lens system L.

In step S9, the sectional view of the lens with magnified eccentricity is output from the output device J to a recording medium, such as a sheet of paper, a magnetic recording medium, or an optical storage medium, as necessary. Examples of methods for outputting the sectional view of the lens with magnified eccentricity include representing it from a printer, i.e., printing it out, and outputting it in a format displayable in another personal computer or the like, such as bitmap format or joint photographic experts group (JPEG) format, to a magnetic recording medium, an optical storage medium, or other electronic storage mediums as known by one.

In step S10, numerical data related to the amount of eccentricity is output from the output device J to a recording medium, as necessary. Examples of methods for outputting the numerical data include a method for printing it with a combination of a parallel eccentricity component and a slope eccentricity component and a method for outputting it in text format displayable in another personal computer or the like to a recording medium.

Exemplary examples of sectional views of a lens system, displayed by methods in accordance with at least one exemplary embodiment are described below. Other sectional views and methods of displaying them should be included with the scope of exemplary embodiments and the discussion below should not be interpreted to limit the scope.

Figure 4:
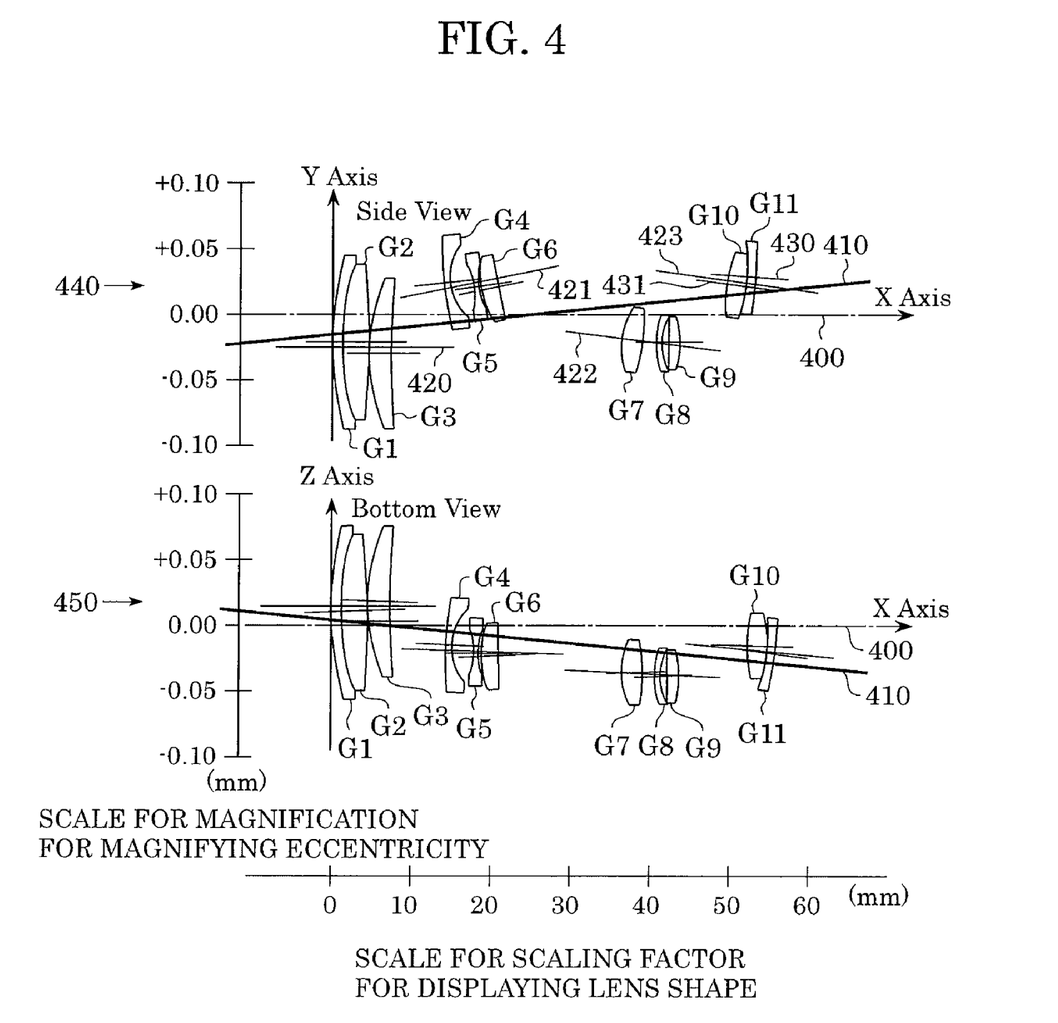
FIG. 4 illustrates a sectional view of a lens system in the X-Y plane and the X-Z plane having exaggerated eccentricity in accordance with at least one exemplary embodiment.

FIG. 4 shows one example of a sectional view of a lens system with magnified eccentricity displayed. In FIG. 4, the left indicates a side facing an object, and the right indicates a side facing an image. FIG. 4 illustrates an example of a lens system to be measured, in this example a zoom lens consisting of 11 lens elements G1 to G11 disposed from the left to the right, these 11 lens elements are classified into four lens groups. The lens elements G1 to G3 constitute a first lens group, the lens elements G4 to G6 constitute a second lens group, the lens elements G7 to G9 constitute a third lens group, and the lens elements G10 and G11 constitute a fourth lens group.

In FIG. 4, the measuring reference axis 400 is indicated by a dash-dot line, the evaluation axis 410 of the entire lens system is indicated by a heavy line, the evaluation axis of each of the lens groups 420, 421, 422, and 423 are indicated by a middle line through the respective lens group, and the optical axis of each of the lens elements is indicated by a light line (e.g. 430, 431).

Each of the evaluation axis 410 of the entire lens system and the evaluation axes of the lens groups (420, 421, 422, and 423) is set as a mean axis determined by the least square method such that an angle defined between the evaluation axis and the normal of each lens surface becomes minimal. As discussed above the evaluation axis is not limited to such a mean axis, however. The evaluation axis may be defined by any appropriate value.

When an eccentric state of the zoom lens is measured at the end of a wide-angle position and at the end of a telephoto position, the mean axis of the entire lens system at one end may be different from that at the other end, depending on the eccentric state present in the lens system. In some cases, one can evaluate a lens by using a single evaluation axis at the end of a wide-angle position and at the end of a telephoto position in order to determine variations in the eccentric state of the lens system due to a zooming operation. To this end, it is desirable that the lens be evaluated with the same evaluation axis at the ends of wide-angle and telephoto positions by setting a suitable average axis in consideration of mean axes of the entire lens system at both ends. Whether or not to display each of the evaluation axes can be freely selected.

Figure 5:
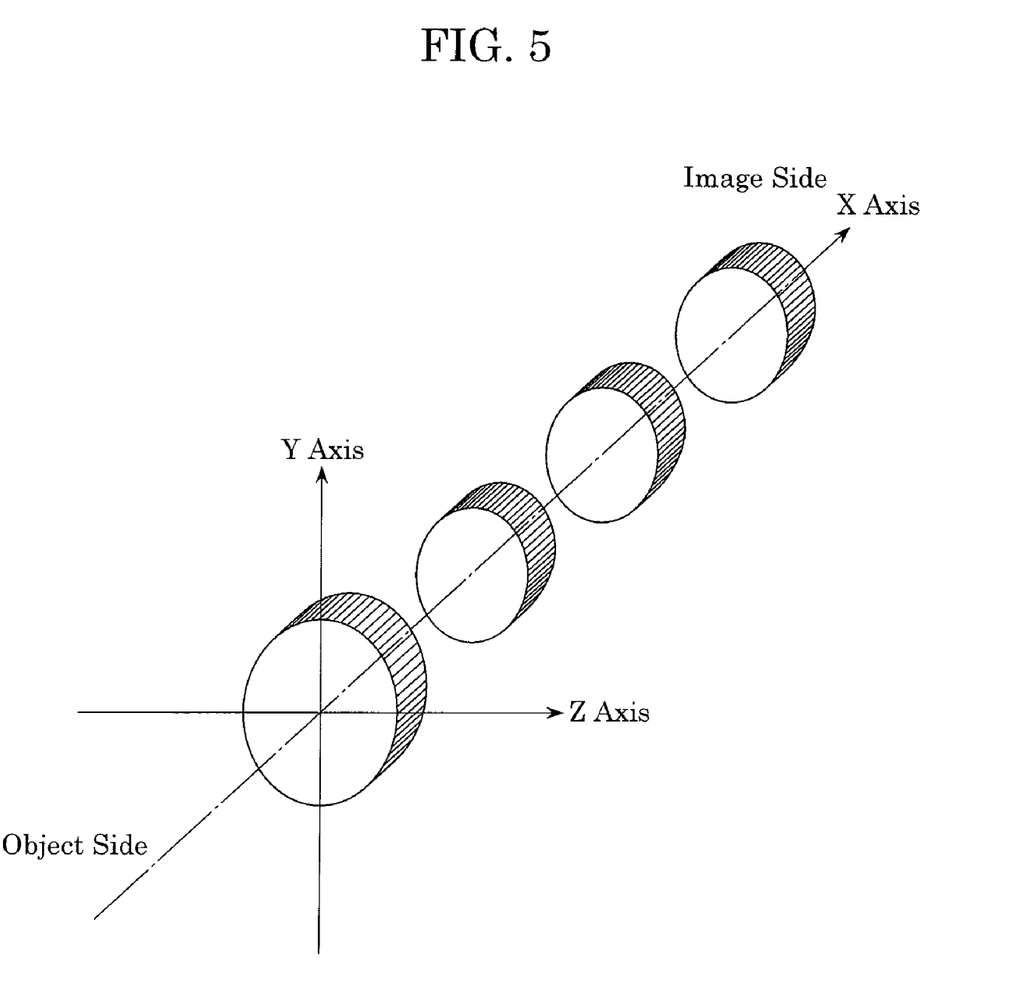
FIG. 5 illustrates the coordinate system shown in FIG. 4.

The particular coordinate system used in FIG. 4 is shown in FIG. 5, however any number of coordinate systems can be used and other coordinate systems as known by one of ordinary skill in the art is intended to lie within the scope of at least one exemplary embodiment. In FIG. 5 the coordinate system is as described in Yoshiya Matsui, "Renzu Sekkei Hou" [Method for Designing Lens System], Kyoritsu Shuppan. As shown in FIG. 5, distances from the side facing an object to the side facing an image are taken as positive. The optical axis is taken as the x-axis. An axis perpendicular to the x-axis is the y-axis, and distances along the y-axis from the bottom to the top are taken as positive. An axis perpendicular to the x-axis and the y-axis is taken as the z-axis, and the positive z-axis is from the left to the right on the paper and completes a right hand rule coordinated system.

In FIG. 4, an eccentric state of the lens system is shown by a combination of two section views of the lens with magnified eccentricity. One is a first section view 440 defined by the x-axis and the y-axis, as seen from a side, and referred to as "Side View" in FIG. 4. The other 450 is a second section view defined by the x-axis and the z-axis, as seen from the bottom, and referred to as "Bottom View" in FIG. 4. The combination of these two section views allows an observer to visually determine how the lens system is eccentric vertically and horizontally.

The scaling factor for displaying a lens shape can be freely set so that the sectional view of the lens is displayed on a display screen at an appropriate size.

A scale matching a set scaling factor displaying a lens shape is shown in the lower portion of FIG. 4.

Since the amount of eccentricity present in a lens system is very small, displaying a measured amount of eccentricity at an actual magnification of the lens does not enable an observer to visually recognize an eccentric state. Therefore, a magnification factor for magnifying eccentricity can be freely set so that the amount of eccentricity is visually recognizable. A scale matching a set magnification factor for magnifying eccentricity is shown in the left portion of FIG. 4.

For displaying the amount of eccentricity of a lens as a numerical value, the amount of parallel eccentricity and the amount of slope eccentricity are shown. The amount of parallel eccentricity is usually displayed in millimeters, and the amount of slope eccentricity is usually displayed in minutes or seconds in angular measurement.

For representing a sectional view of a lens with magnified eccentricity, the amount of parallel eccentricity is directly multiplied by a magnification factor for magnifying eccentricity. On the other hand, directly multiplying the amount of slope eccentricity by a magnification factor for magnifying eccentricity has disadvantages. If the amount of slope eccentricity is multiplied by a larger magnification factor, the magnified amount of slope eccentricity becomes too large compared with the magnified amount of parallel eccentricity. This can result in an imbalance between the amount of parallel eccentricity and the amount of slope eccentricity, and can thus lead to a distorted sectional view of a lens with magnified eccentricity.

In at least one exemplary embodiment, a tangent of the amount of slope eccentricity is multiplied by a magnification factor for magnifying eccentricity to determine a magnified angle for displaying magnified slope eccentricity. This particular method in accordance with at least one exemplary embodiment can balance the amount of parallel eccentricity and the amount of slope eccentricity. Thus, even if the magnification factor for magnifying eccentricity is set at a large value, the sectional view of a lens with magnified slope and parallel eccentricity can be displayed appropriately.

Figure 6:
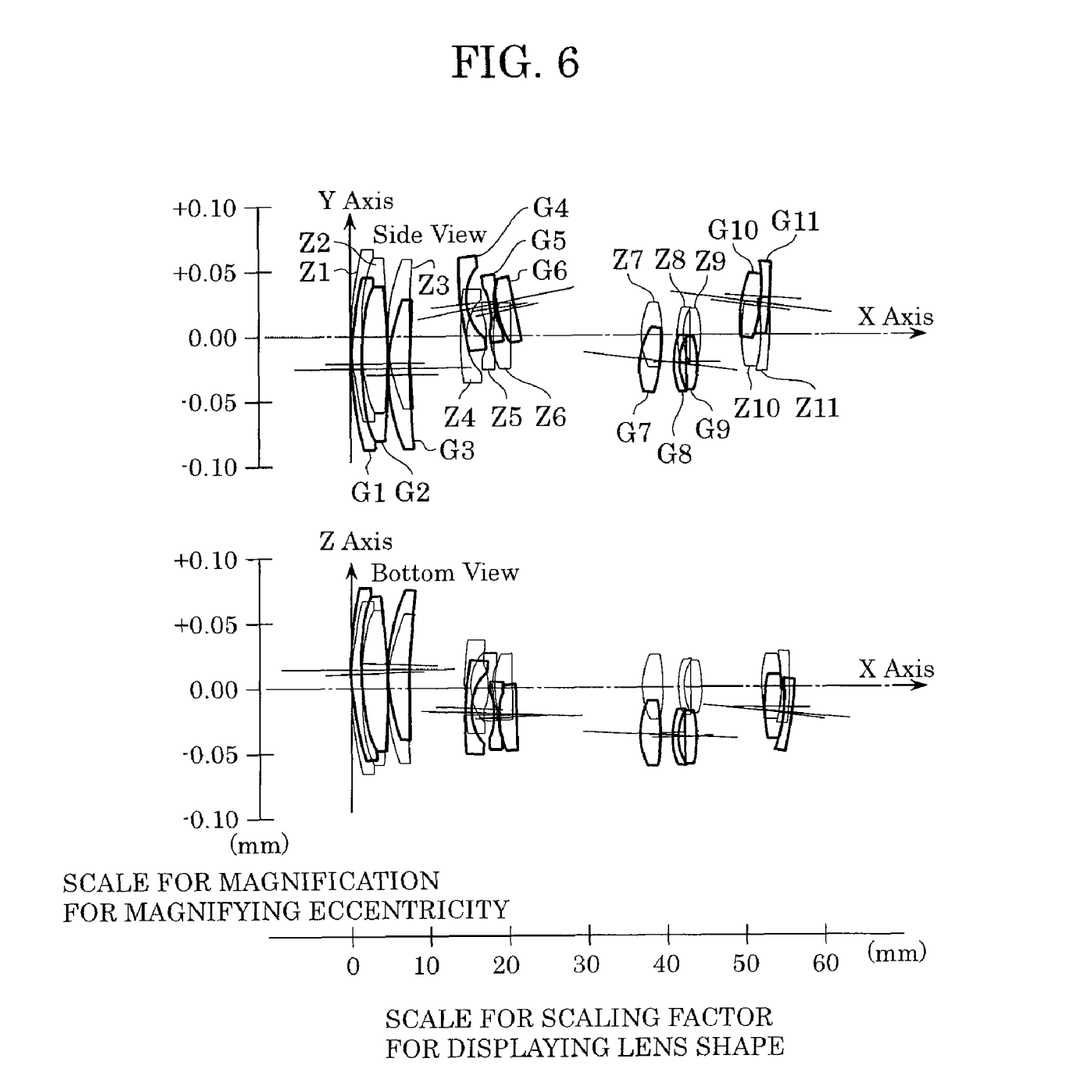
FIG. 6 illustrates a sectional view of a lens with an exaggerated eccentricity related to linearly aligned lens elements in accordance with at least one exemplary embodiment.

FIG. 6 illustrates the same eccentric state as shown in FIG. 4. In FIG. 6, however, the mean axis of the entire lens system is not shown, and the measuring reference axis (x-axis) is set as the mean axis of the entire lens system. In at least one exemplary embodiment the eccentricity measurement of a lens system, measures the eccentricity when a reference plane for mounting a lens, where in this case the reference plane functions as the design reference of the lens system, matches an eccentricity measurement reference axis. In this case, the measurement reference axis is coincident with an optical axis in the design reference, and it is desirable to set the measuring reference axis as the evaluation axis of the entire lens system. In order to clearly display how actual lens elements are eccentric with respect to the design reference state, the lens in the design reference is depicted by outlines that are not enhanced (e.g. Z1 through Z11), whereas the lens that is actually eccentric is indicated by an enhanced outlines (e.g. G1 through G11).

Whether the lens in the design reference state is displayed or hidden can be freely selected.

Figure 7:
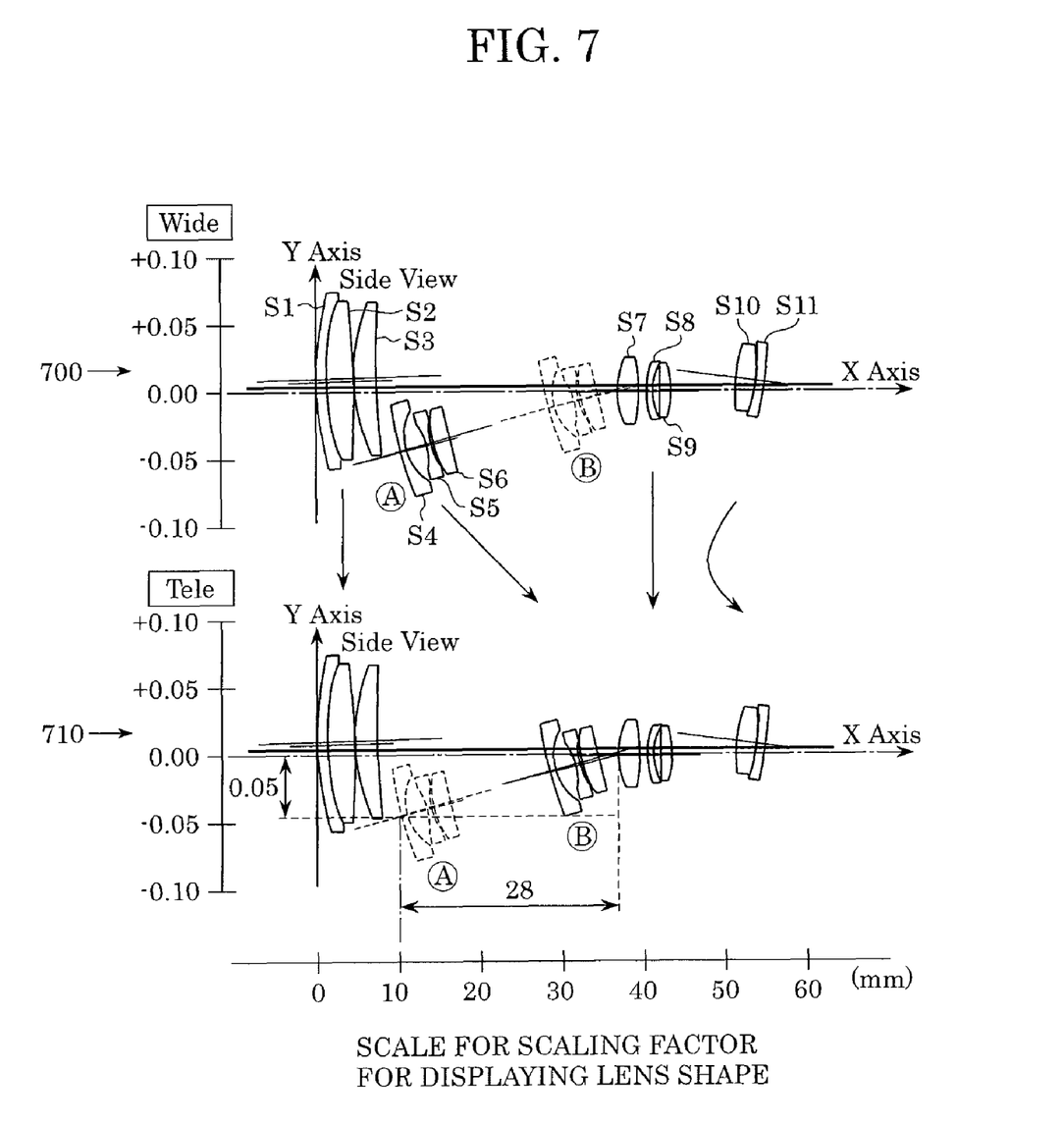
FIG. 7 illustrates steps of a method in accordance with at least one exemplary embodiment.

FIG. 7 shows an example of displaying results of measurement of eccentricity, in accordance with at least one exemplary embodiment, at the end of a wide-angle position and at the end of a telephoto position in a cross section defined by the x-axis and the y-axis. In FIG. 7, a first section view of a lens with magnified eccentricity depicting an eccentric state at the end of a wide-angle position is shown in the upper portion 700, and a second sectional view of a lens with magnified eccentricity depicting an eccentric state at the end of a telephoto position is shown in the lower portion 710.

In a zooming operation, with reference to FIG. 7, the first lens group (e.g. S1, S2, S3, and S4) and the third lens group (e.g. S7, S8, and S9) do not move with respect to an image plane. The second lens group (e.g. S4, S5, and S6) moves simply from the side (A) facing the object to the side (B) facing the image plane when the lens system is shifted from the end of a wide-angle position to the end of a telephoto position by a zooming operation, as shown in the lower portion 710. The fourth lens group (e.g. S10, S11) moves to the side facing the object and then moves to the side facing the image plane so as to exhibit a convex path while the lens system is shifted from the end of a wide-angle position to the end of a telephoto position by a zooming operation. In FIG. 7, the path of each lens group is indicated by a line with an arrow.

FIG. 7 shows a particular example in which the second lens group is largely eccentric in the sectional view of the lens with magnified eccentricity. If this second lens group at the end of a wide-angle position (A) is compared with that at the end of a telephoto position (B), eccentricity can be visually recognized, thus facilitating finding a cause for eccentricity errors.

In the first section view 700 displaying the eccentric state at the end of a wide-range position of FIG. 7, the second lens group at the end of a telephoto position (B) is shown with a dotted outline. Similarly, in the second section view 710 displaying the eccentric state at the end of a telephoto position of FIG. 7, the second lens group at the end of a wide-range position (A) is shown with a dotted outline.

In the exemplary embodiment shown, the slope eccentricity is present in a guide of a sliding unit which is moved by a zooming operation. In addition, this drawing indicates that the amount of travel of the second lens group resulting from a zooming operation is 28 mm and the amount of parallel eccentricity in the eccentric state of the second lens group in the zooming operation is 0.05 mm. Therefore, it can be readily determined that the amount of slope of the guide of the sliding unit for the second lens group is $\tan^{-1}(0.05/28)$, that is, 6 minutes. Where the amount of travel is measured along the x-axis from the second lens group's mean axis intercept point with the x-axis to the final first surface vertex projected on the x-axis. In order to solve this eccentricity problem, it can be readily understood that correcting slope eccentricity of the guide of the sliding unit with respect to a point around 38 mm in the optical axis on the scale for a scaling factor for displaying a lens shape is required.

Figure 8:
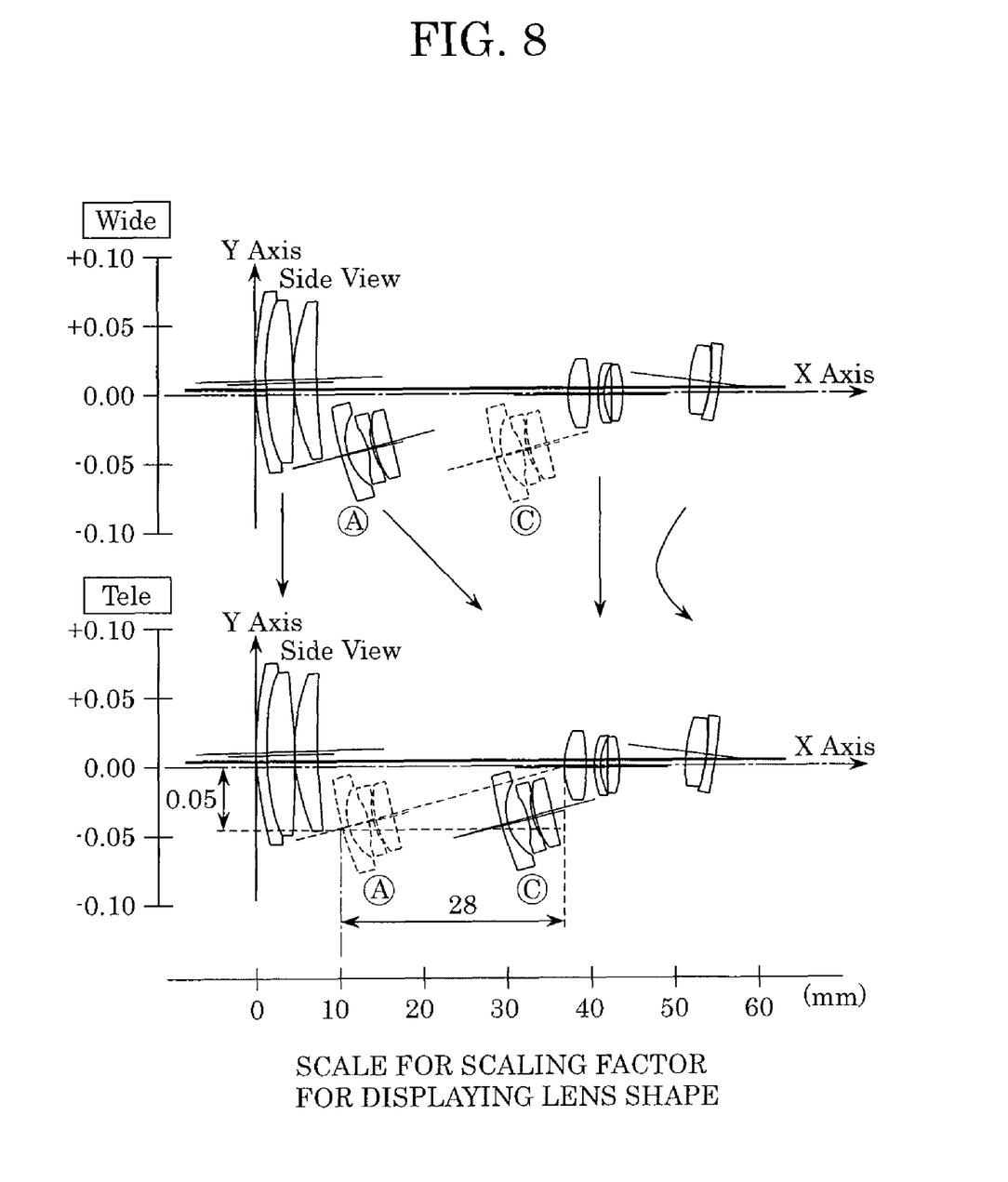
FIG. 8 illustrates further steps of a method in accordance with at least one exemplary embodiment.

FIG. 8 is a sectional view of a lens system with magnified eccentricity in accordance with at least one exemplary embodiment. This sectional view also shows a state in which the second lens group is largely eccentric. In FIG. 8, an eccentric state of the lens system at the end of a wide-range position is the same as in FIG. 7, but an eccentric state of the second lens group at the end of a telephoto position is different (C). The eccentric state of the second lens group at the end of a telephoto position is moved in parallel with the evaluation axis (x-axis) of the entire lens system from position A to position C. In the example shown in FIG. 8, essentially no eccentricity error component of slop eccentricity in a zooming operation is present in the guide of the sliding unit of the second lens group. Rather a tilt amount of eccentricity of 6 minutes is caused by a tilt of a lens supporting frame of the second lens group with respect to the sliding unit (not shown).

Thus, in the example shown, correcting the slope of the lens supporting frame of the second lens group by 6 minutes and correcting an amount of parallel eccentricity of 0.05 mm are necessary.

Displaying a result of measurement of eccentricity with the sectional view of a lens with magnified eccentricity in this manner facilitates a lens designer, a designer of a lens barrel, a person who performs processing on parts, a person who assembles parts, and a person who evaluates a lens system to readily determine the result of measurement of eccentricity. In addition, analyzing an eccentric state present in the lens system shown in the sectional view of a lens with magnified eccentricity leads to readily reaching and implementing solutions to an eccentricity problem.

Exemplary embodiments can aid in many optical design situations and the following are provided solely for illustrative non limiting purposes. For example, the following situation can be aided by exemplary embodiments:

(a) As is often the case, even if individual parts of a lens barrel are subjected to processing within tolerances, the lens barrel in an assembled state may have an eccentricity error larger than would be expected. This is because unexpected distortion may be created in the lens barrel during assembly. By analyzing eccentricity of the lens system in an assembled state shown in a sectional view of a lens with magnified eccentricity, a designer of the lens barrel can find a clue to determine where a problem exists and can acquire effective information to solve this problem in terms of the structure of the lens barrel;

(b) A person who performs processing on parts of the lens barrel can determine what part has a problem with a processing error by comparing an actual lens system with a sectional view of the lens system with magnified eccentricity. In addition, he or she can readily determine the part, the section within the part, and the extent to be corrected;

(c) A person who assembles parts can determine the part, the section within the part, and the direction in which eccentricity is present by comparing an actual lens system with a sectional view of the lens system with magnified eccentricity. As a result, he or she can take measures against an eccentricity problem, such as assembly of parts in a side that removes an eccentricity error when the lens barrel is assembled, correction using a spacer or a washer, or the like; and (d) A person who evaluates a lens system can readily determine the relation between eccentricity and a problem caused by the eccentricity, such as image-blurring in one side or flare, by determining the eccentric state of the lens system. Therefore, he or she can stably produce high-quality lens systems in conjunction with a person who performs processing on parts of a lens barrel and a person who assembles the parts.

At least one exemplarily embodiment can be used to improve the determination of an eccentric state of a lens system, which in at least one exemplary embodiment can include multiple lens elements (e.g. zoom lens). Additionally, at least one exemplary embodiment can be used to analyze and address an eccentricity problem in the lens system.

Although examples of exemplary embodiments have been provided and discussed, other exemplary embodiments are possible and at least one exemplary embodiment is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for displaying a result of measurement of eccentricity, the method comprising the steps of:
   sequentially projecting an indicator to a position of each design apparent center of curvature of a plurality of surfaces to be measured, the surfaces being included in a lens system to be measured; and
   displaying an amount of eccentricity of each surface to be measured, the amount of eccentricity being determined from a state of a reflected image of the indicator, the reflected image being reflected from each surface to be measured,
   wherein the amount of eccentricity is magnified using a magnification factor and the magnified amount of eccentricity is represented in a sectional view of the lens system, using a scaling factor of the lens system to display the lens system, wherein the scaling factor and the magnification factor are independently valued.

2. The method according to claim 1, wherein the amount of eccentricity is magnified so that a tangent component of a tilt amount of eccentricity in the amount of eccentricity is multiplied by the magnification factor for magnifying the amount of eccentricity and that a shift amount of eccentricity in the amount of eccentricity is directly multiplied by the magnification factor for magnifying the amount of eccentricity, so that the magnified amount of eccentricity is represented.

3. The method according to claim 1, wherein the amount of eccentricity is displayed so that a first scale indicating the length along an optical axis and a second scale indicating the amount of eccentricity in a direction perpendicular to the optical axis are represented.

4. The method according to claim 1, the amount of eccentricity is displayed so that an eccentricity state of the lens is shown by two cross sections, one being defined by the x-axis and y-axis and the other being defined by the x-axis and z-axis, where the x-axis is an optical axis of the lens system, the y-axis is an axis perpendicular to the optical axis, and the z-axis is an axis perpendicular to the x-axis and y-axis.

5. The method according to claim 1, wherein the amount of eccentricity is displayed so that that a section view of the lens system with the magnified amount of eccentricity is represented by an enhanced line and a section view of the lens system in a reference state is represented by a line that is not enhanced, the reference state including no eccentricity with respect to a measuring reference axis.

6. The method according to claim 1, wherein the amount of eccentricity is displayed in so that at least one of an evaluation axis of the lens system, a mean axis, and an optical axis of each lens element is represented, the mean axis being determined with respect to the evaluation axis of individual lens groups into which the lens system is divided.

7. The method according to claim 1, wherein the amount of eccentricity is displayed in so that one of the results of measurement of eccentricity of the lens system in different focusing states of the lens system and different zooming states of the lens system is represented.

8. The method according to claim 1, wherein the amount of eccentricity is displayed so that the magnified amount of eccentricity is represented in a display device.

9. The method according to claim 1, wherein the amount of eccentricity is displayed so that the magnified amount of eccentricity is represented on a medium from a printing device.

* * * * *